(12) United States Patent
Oxley

(10) Patent No.: US 11,148,113 B2
(45) Date of Patent: Oct. 19, 2021

(54) MICROENCAPSULATION UTILIZING AN UNSATURATED ALKYL CARBOXYLIC ACID AND/OR AN UNSATURATED ALKYL ESTER

(71) Applicant: SOUTHWEST RESEARCH INSTITUTE, San Antonio, TX (US)

(72) Inventor: James D. Oxley, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 226 days.

(21) Appl. No.: 16/391,609

(22) Filed: Apr. 23, 2019

(65) Prior Publication Data
US 2020/0114326 A1  Apr. 16, 2020

Related U.S. Application Data

(60) Provisional application No. 62/663,909, filed on Apr. 27, 2018.

(51) Int. Cl.
*B01J 13/06* (2006.01)

(52) U.S. Cl.
CPC .................... *B01J 13/06* (2013.01)

(58) Field of Classification Search
CPC ................. B01J 13/06; B01J 13/16
See application file for complete search history.

(56) References Cited

U.S. PATENT DOCUMENTS

| | | | |
|---|---|---|---|
| 3,516,846 | A | 6/1970 | Matson |
| 6,969,734 | B1 | 11/2005 | Pressley et al. |
| 2009/0004394 | A1 | 1/2009 | Koller et al. |
| 2011/0064817 | A1 | 3/2011 | Casana Giner et al. |
| 2014/0010859 | A1 | 1/2014 | Chen |
| 2014/0102331 | A1 | 4/2014 | John et al. |
| 2018/0094157 | A1 | 4/2018 | Halstead |

FOREIGN PATENT DOCUMENTS

| | | |
|---|---|---|
| CN | 103 752238 A | 4/2014 |
| EP | 2 009 072 B1 | 8/2016 |
| GB | 2388581 * | 11/2003 |
| JP | 2007-270015 A | 10/2007 |
| WO | 2017100572 A1 | 6/2017 |
| WO | 2017123965 A1 | 7/2017 |

OTHER PUBLICATIONS

Behzadnasab, M.; et al; "Preparation and Characterization of Linseed Oil-filled Urea—formaldehyde Microcapsules and Their Effect on Mechanical Properties of an Epoxy-based Coating"; Colloids and Surfaces A: Physicochemical and Engineering Aspects 2014, 457, pp. 16-26.
Chang, T. M. S.; "Semipermeable Microcapsules." Science vol. 146 (3643): (Oct. 23, 1964).524-525.
Darwish, M.S.A., et al ; "Bi-Layered Polymer-Magnetite Core/Shell Particles: Synthesis and Characterization"; Journal of Material Science, Kluwer Academic Publishers, Bo, vol. 46, No. 7, Nov. 16, 2010; pp. 2123-2213 cited as X in the EESR dated Aug. 21, 2019.
Ebrey, Patricia Buckley, et al; (2006). "East Asia: A Cultural, Social, and Political History"; . Boston: Houghton Mifflin Company. p. 133.
Follmann, Klaus Last. "Stable Core-Shell Microcapsules for Industrial Application," presented at the 15th Industrial Symposium and 6th Trade Fair on Microencapsulation, Archamps, France, Mar. 2012.
Karim, A, et al (2008). "Gelatin Alternatives for the Food Industry: Recent Developments, Challenges and Prospects." Trends in Food Science & Technology vol. 19 (12): pp. 644-656.
Kondo, A. (1979). Microcapsule Processing Technology. New York, Marcel Dekker, Inc. // Listing of the book's contents by Dost ScINET-PHIL Accessed Oct. 25, 2020 «http://scinet.dost.gov.ph/union/.
Li, M., O. Rouaud, et al. (2008). "Microencapsulation by solvent evaporation: State of the art for process engineering approaches." International Journal of Pharmaceutics 363(1-2): 26-39.
National Toxicology Program (Jun. 2011). Report on Carcinogens, Twelfth Edition. Department of Health and Human Services, Public Health Service, National Toxicology Program. Abstract accessed Apr. 16, 2018 «https://www.ncbi.nlm.nih.gov/pubmed/21822324».
Nori, M. P., C. S. Favaro-Trindade, et al. (2011). "Microencapsulation of propolis extract by complex coacervation." LWT—Food Science and Technology 44: 429-435.
Poth, U., Drying Oils and Related Products. In Ullmann's Encyclopedia of Industrial Chemistry, Wiley-VCH Verlag GmbH & Co. KGaA: 2000.
Samadzadeh, M.; Boura, S. H.; Peikari, M.; Ashrafi, A.; Kasiriha, M., Tung oil: An autonomous repairing agent for self-healing epoxy coatings. Prog Org Coat 2011, 70 (4), 383-387.
World Encapsulated Food Market—Opportunities and Forecasts Research and Markets, 2016. Accessed Oct. 25, 2020 «https://www.businesswire.com/news/home/20160720005903».
Yang, J., M. W. Keller, et al. (2008). "Microencapsulation of Isocyanates for Self-Healing Polymers." Macromolecules 11(24): 9650-9655.
EESR extended European search report issued in related European appln No. 19 171 300.7 dated Aug. 21, 2019 (8 pgs).
Intent to Grant dated Dec. 15, 2020, issued in European Patent Application No. 19 171 300.7, 7 pages.

* cited by examiner

*Primary Examiner* — Irina S Zemel
(74) *Attorney, Agent, or Firm* — Grossman, Tucker, Perreault & Pfelger, PLLC

(57) ABSTRACT

The present invention relates to microencapsulation of core materials utilizing one or more unsaturated alkyl carboxylic acids and/or one or more unsaturated alkyl esters which are capable of oxidation and microcapsule formation. The unsaturated alkyl carboxylic acid(s) may specifically include drying oils and/or drying oil components. The unsaturated alkyl ester(s) may specifically include a glycerol ester of a fatty acid.

24 Claims, 14 Drawing Sheets

500
MICROENCAPSULATION UTILIZING AN UNSATURATED ALKYL CARBOXYLIC ACID AND/OR AN UNSATURATED ALKYL ESTER

CROSS-REFERENCE TO RELATED APPLICATIONS

This application claims the benefit of U.S. Provisional Application Ser. No. 62/663,909 filed on Apr. 27, 2018, which is fully incorporated by reference.

FIELD

The present invention relates to microencapsulation of core materials utilizing one or more unsaturated alkyl carboxylic acids and/or one or more unsaturated alkyl esters which are capable of oxidation and microcapsule formation.

BACKGROUND

Microencapsulation leading to core-shell structure can range in size from tens of nanometers to tens of millimeters, and multiple technologies are required to cover this broad range. A variety of encapsulation techniques have been reported in the prior art. For example, chemical based techniques are reported which rely upon the formation of an emulsion, such as oil-in-water, followed by formation of a shell using a condensation, interfacial polymerization, or coacervation system. The final capsule size is determined by the initial emulsion droplet size. The ability and ease of preparing droplets less than 100 μm, and down to submicron, makes the emulsion-based technologies attractive to multiple industries. For example, pharmaceutical companies require capsules small enough for intramuscular injection, food companies require capsules small enough to avoid mouth feel issues in a beverage, and cosmetic companies require capsules that feel smooth on the skin.

The most commonly practiced emulsion-based encapsulation techniques are in situ polymerization, interfacial polymerization, coacervation, and solvent evaporation. These processes represent the state-of-the-art on an industrial scale. In situ polymerization was developed in the 1960's for the formation of a poly(urea formaldehyde) or poly(melamine formaldehyde) shell around a water insoluble droplet. Interfacial polymerization, also developed in the 1960's, can be used to form a polyurea, polyurethane, polyamide, polyamine or polycarbonate shell around a water or oil droplet. Coacervation, practiced as simple or complex, was the first encapsulation process commercialized in the 1940's for carbonless copy paper, forming a gelatin shell around a water insoluble droplet. The final technique, solvent evaporation, is an in-water drying technique using the evaporation of a solvent in emulsified droplets to precipitate a microsphere.

Recently, in situ polymerization has become an unfavorable approach due to the use of formaldehyde in the capsule formation process. Formaldehyde was recently upgraded to a 'known carcinogen' by the Food and Drug Administration, forcing many companies to find alternative encapsulation systems. Gelatin-based coacervation is still widely used, but the preference to have animal free products turns many companies away from the use of encapsulation altogether.

The emulsion-based process not used for pharmaceuticals, nutraceuticals/food, cosmetics and consumer products is interfacial polymerization. Primarily used in the agricultural industry, interfacial polymerization uses highly reactive acyl chlorides and isocyanates that prevent the use of the subsequent capsules in products that come into contact with humans and animals. Additionally, the use of these highly reactive monomers limits their application with reactive core materials.

Accordingly, a need exists in the industry for an encapsulation technology that relies upon a system that can be sourced from natural materials and is suitable, e.g., for food/pharmaceutical use.

SUMMARY

A method for producing microcapsules comprising forming a dispersion containing one or more unsaturated alkyl carboxylic acids and/or one or more unsaturated alkyl esters, both at a minimum molecular weight of 200 and both capable of oxidation, and a core material. One may then optionally supply an oxidation catalyst in the dispersion, and then supply oxygen to the dispersion and initiate oxidation of said one or more alkyl carboxylic acids and/or one or more unsaturated alkyl esters and forming a core-shell microcapsule structure wherein the core-shell structure is formed within a period of ≤96.0 hours. This method is particularly applicable for the preparation of heterogeneous shell or core morphology.

The present invention also relates to a method for producing microcapsules comprising forming a dispersion containing one or more unsaturated alkyl carboxylic acids and/or one or more unsaturated alkyl esters, both at a minimum molecular weight of 200 and both capable of oxidation, and a core material, optionally supplying an oxidation catalyst in the dispersion, and supplying oxygen to the dispersion and initiating oxidation of said one or more alkyl carboxylic acids and/or one or more unsaturated alkyl esters and forming a microcapsule structure wherein said microcapsule is formed within a period of ≤96.0 hours. This method is particularly applicable for the preparation of microcapsules which comprise a solid homogenous bead of oxidized polymeric material and a soluble active ingredient as well as liquid or solid particles that are dispersed in an oxidized unsaturated polymeric matrix.

DETAILED DESCRIPTION

Figure 1:
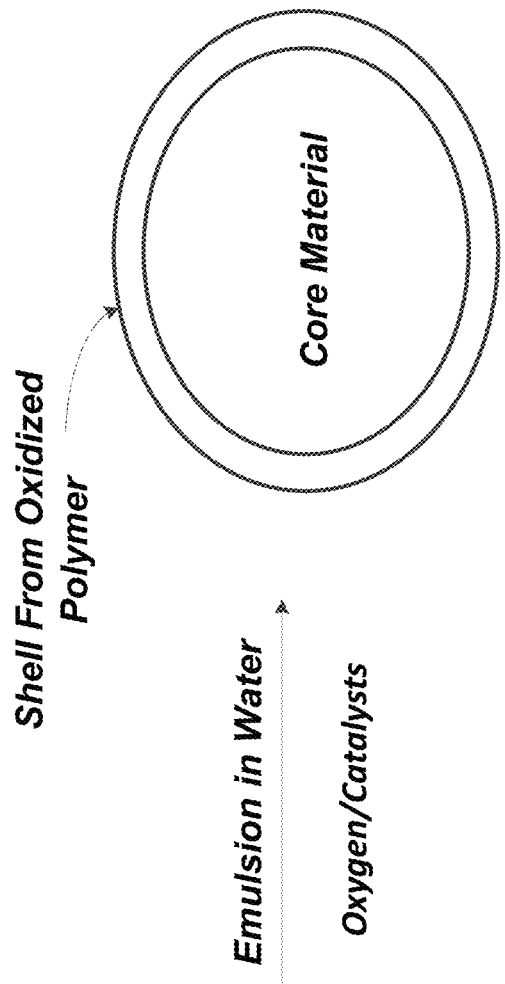
FIG. 1 illustrates microencapsulation utilizing a drying oil and a core material that are mixed and emulsified into water.

FIG. 1 illustrates one embodiment of the present invention. One or more unsaturated alkyl carboxylic acids and/or one or more unsaturated alkyl esters, both having a minimum molecular weight of 200, and core material are mixed and emulsified into water. The level of unsaturated alkyl carboxylic acid and/or unsaturated alkyl ester, in the dispersed phase, is preferably at a level of 1 wt. % to 95 wt. %, more preferably 10 wt. % to 50 wt. % as well as 10 wt. % to 30 wt. %. The water phase may optionally include silica to assist in stabilization of the as-formed emulsion as well as a surfactant or dispersing agent. The one or more unsaturated alkyl carboxylic acids contain alkyl groups (e.g. methine or —CH— groups, methylene or —$CH_2$— groups or methyl or —$CH_3$ groups) and residual unsaturation (carbon-carbon double bonds) and one or more carboxylic acid groups, and as noted, has a molecular weight of at least 200. The one or more unsaturated alkyl esters similarly contain alkyl groups and one or more ester groups and residual unsaturation (carbon-carbon double bonds) and as noted, also has a molecular weight of at least 200.

The residual unsaturation is such, that upon oxidation, the one or more unsaturated alkyl carboxylic acids and/or the one or more unsaturated alkyl esters will react (e.g. crosslink) and solidify to form a plurality of microcapsules. Preferably, the one or more unsaturated alkyl carboxylic acids are selected from a drying oil which is reference to a natural oil with unsaturation that are similarly capable of oxidation to harden and form the shell structure. Preferably, such oils include linseed oil, tung oil, poppy seed oil, oiticica oil, safflower oil, sunflower oil, soybean oil, cottonseed oil, fish oil, castor oil, perilla oil, tall oil and walnut oil or mixtures thereof. Preferably, the one or more unsaturated alkyl esters are selected from a glycerol ester of a fatty acid. Reference to a fatty acid is understood as a carboxylic acid with an aliphatic chain, along with unsaturation, that have up to about 30 carbon atoms.

Upon exposure to oxygen, which is preferably achieved by bubbling oxygen or air into the emulsion, the one or more unsaturated alkyl carboxylic acids and/or the one or more unsaturated alkyl esters will undergo oxidation and crosslinking resulting in a polymer network structure that provides microcapsule formation. Accordingly, one can supply oxygen via the direct use of oxygen or via the use of air. Optionally, one may include an oxidation catalyst to accelerate the formation of the polymer network formation. Such microcapsule formation may include a core-shell structure, wherein the polymerized unsaturated alkyl carboxylic acid (preferably the aforementioned oils) form the shell, or wherein the polymerized unsaturated alkyl carboxylic acid can provide a microcapsule without a defined shell portion, as described herein. Similarly, one may provide microcapsule formation herein via use of an unsaturated alkyl ester.

In addition, it should be noted that components of the oils, such as linoleic acid, linolenic acid, palmitic acid, oleic acid, or α-eleostearic acid, either on their own or as mixtures thereof, may be similarly used to form the shell structure. In addition, such components can be blended with the aforementioned oils to provide a shell-forming material as described herein. Furthermore, in the broad context of the present disclosure, as noted above, it is contemplated that one can utilize one or more unsaturated alkyl carboxylic acids and/or one or more unsaturated alkyl esters, with residual unsaturation, at molecular weights of at least 200, that are capable of oxidation to solidify and form the microcapsule, where it can be understood that a plurality of microcapsules are generally formed.

The core material herein may be a solid, liquid or gas. In addition, the core material may include both water soluble and water insoluble liquid. In the case of preparation of a microcapsule herein with water soluble liquids or gases, one may utilize a double emulsion formed with the aqueous core or gas material dispersed in a liquid drying oil, and then further dispersed into water for oxidation of the drying oil to form the shell material. The core material may also include phase change materials, as discussed further herein, as well as flavor or fragrance oils. Fragrance oils are also known as aroma oils or aromatic oils, which is reference to synthetic aroma compounds or natural essential oils. Natural essential oils is reference to volatile plant extracts that are typically made from steam distilling or cold-pressing flowers, bark, stems, leaves, peel, roots, seeds or other parts of a plant. The core materials may also include an active pharmaceutical ingredient, which may be understood as biologically active, such as a drug that produces its effects. Accordingly, any microcapsule herein is contemplated for either oral or parenteral delivery. Moreover, the core materials herein may include a pesticide which is utilized to combat insects or other organisms that are harmful to cultivated plants or to animals.

Significantly, the oxidation of the one or more unsaturated alkyl carboxylic acids and/or one or more unsaturated alkyl esters herein or oxidation of the preferred natural oils may be preferably accelerated via exposure to oxygen and an oxidation catalyst. The oxygen can be conveniently bubbled through the emulsion. Alternatively, oxygen can be supplied via a chemical source such as peroxides (e.g. hydrogen peroxide or benzoyl peroxide) or perchlorates (e.g. ammonium perchlorate or potassium perchlorate).

Catalysts that may be optionally utilized to promote oxidation of the one or more unsaturated alkyl carboxylic acids and/or one or more unsaturated alkyl esters include cobalt, iron or magnesium salts which can be preferably present in the continuous (water) phase of the dispersion or emulsion. The catalysts may also include cobalt acetate, cobalt chloride, cobalt sulfate, cobalt tallate, iron sulfate, manganese acetate, manganese chloride or manganese sulfate. These later catalysts may preferably be dissolved or dispersed into the oil phase of the dispersion or emulsion. Such oil phase may comprise the component to be encapsulated, which as noted may include a fragrance oil or phase change material. The addition of catalysts to the oil phase therefore will assist shell formation of the microcapsule. Accordingly, it can be understood herein that in general, reference to the supply of an oxidation catalyst in the dispersion is reference to the feature that the oxidation catalyst may be in the continuous (e.g. water) phase and/or in the dispersed oil phase.

It is contemplated herein that via use of the appropriate levels and concentration of oxygen, that may optionally include the use of catalysis, allows for shell formation and microcapsule preparation within a period of ≤96.0 hours, more preferably ≤72.0 hours, even more preferably ≤48.0 hours or over a period of 24 to 48 hours. More particularly, microcapsule formation can be achieved over a period of 12 to 24 hours, or over a period of 6 to 12 hours. The temperature of the emulsion for the oxidation is preferably in the range of 1° C. to 100° C., more preferably 45° C. to 85° C. The preferred level of oxidation catalyst is in the range of 0.01 g to 1.0 g of catalyst for 30 g of the dispersed oil.

Figure 3:
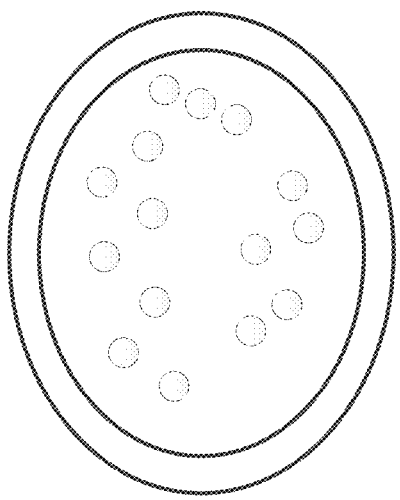
FIG. 3 illustrates a core-shell morphology with a heterogeneous core.
Figure 5:
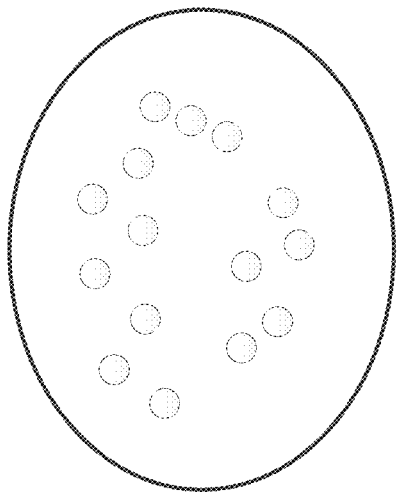
FIG. 5 illustrates solid particles or liquid droplets dispersed through an oxidized polymeric material matrix.
Figure 2:
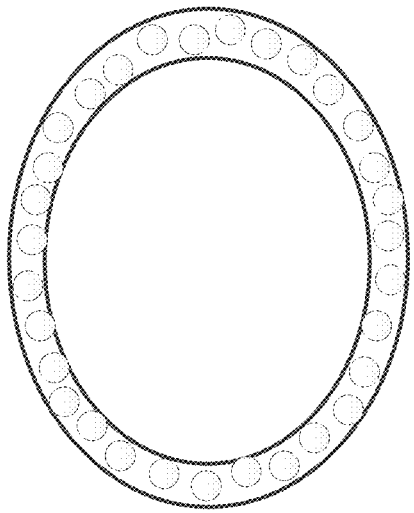
FIG. 2. Illustrates core-shell morphology with a heterogeneous shell.
Figure 4:
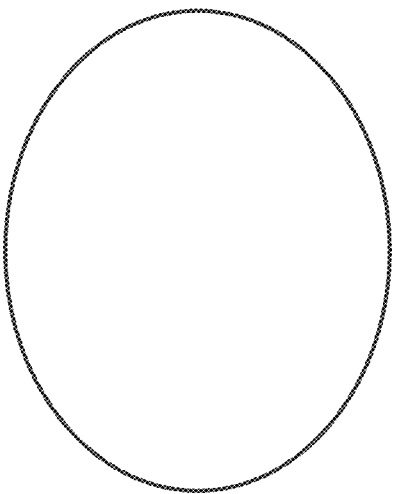
FIG. 4 illustrates a solid homogenous microcapsule of oxidized polymeric material and a soluble active ingredient in the core.
Figure 6:
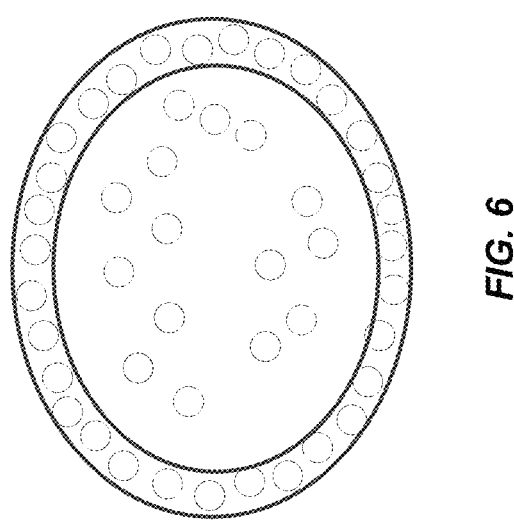
FIG. 6 illustrates a heterogeneous shell morphology and a heterogeneous core morphology.

As illustrated in FIG. 1, the resulting core-shell structure preferably includes a homogeneous core morphology, which can be understood as a core with a single continuous phase. FIG. 2 illustrates the core-shell structure with a heterogeneous shell morphology (i.e. a shell with two phase morphology containing a single continuous phase and a dispersed phase) as in the case where a Pickering emulsion is used to stabilize the oil droplet and particles (e.g. colloidal silica) may be entrapped within the shell. Such particles may be relied upon to alter barrier properties of the shell (increase or decrease in shell porosity), the mechanical properties and strength of the shell, and ensuing release capability. FIG. 3 illustrates a heterogeneous core morphology. The heterogeneous core may be a liquid continuous phase and a liquid dispersed phase or liquid continuous phase and a solid or oil dispersed gas phase, with droplets or particles suspended in a continuous phase carrier fluid, respectively. FIG. 4 illustrates a solid homogenous microcapsule of oxidized drying oil and soluble active ingredient. FIG. 5 illustrates a two phase heterogeneous morphology, with liquid droplets or solid particles or gas bubbles dispersed throughout an oxidized drying oil matrix. FIG. 6 illustrates a two phase shell morphology (heterogeneous shell) with a two phase (heterogeneous) core morphology.

The core-shell structure as formed has a size that can be controlled to fall within a range of >0.1 μm to 1,000 μm, more preferably ≥0.5 μm to 500 μm, and even more preferably 1.0 μm to 50 μm. Such size is conveniently controlled by the emulsification procedure, such as agitation, vessel configuration or the use of surfactants. Emulsification is preferably achieved via overhead stirring of the vessel containing the emulsion, rotor-stator homogenization (i.e. use of spinning inner rotors with a stationary outer sheath), high pressure homogenization (forcing of the liquid emulsion through a system which reduces the particle size of the droplets therein) and microfluidic droplet formation (formation of droplets at the intersection of two immiscible fluid streams).

Surfactants that may be employed preferably include both ionic and non-ionic surfactants such as sodium dodecyl sulfate and polysorbate 80. Surfactants may preferably be present at a level of 0.01 wt. % to 1.0 wt. % in the dispersion. Other surfactants may include glyceryl monostearate, lecithin, poly(vinyl alcohol), xanthum gum, sorbitan monooleate, and ethylene maleic anhydride. Additional emulsification aids include particles for formation of a Pickering emulsion, relying upon materials such as clay, silica, or metal carbonates.

EXAMPLES

Tung Oil Core-Shell Mineral Oil Capsules

Figure 8:
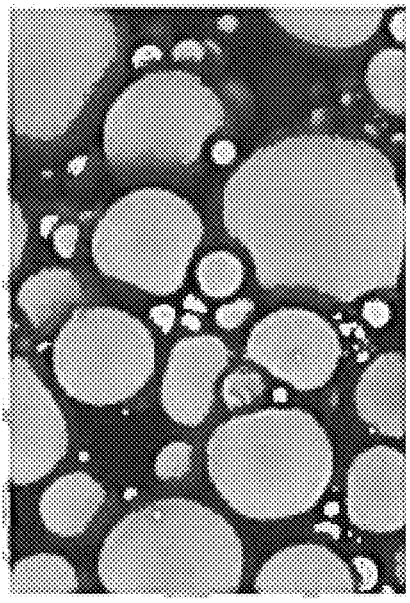
FIGS. 7, 8 and 9 are electron micrographs of microcapsules of a tung oil core-shell mineral oil capsule, at increasing magnification.
Figure 9:
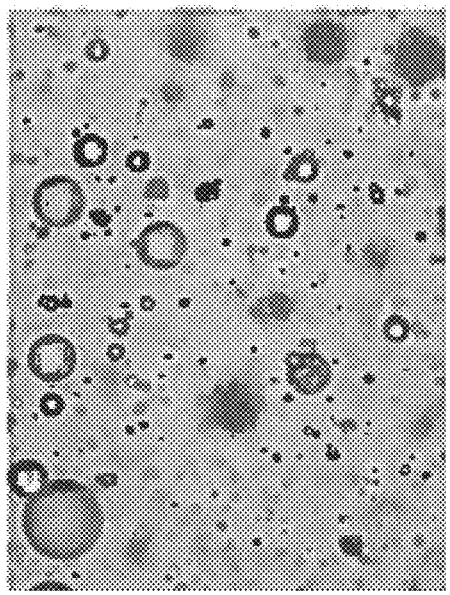
Figure 7:
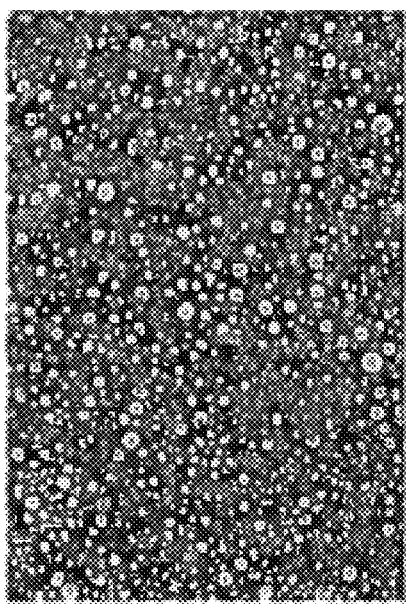

Poly(vinyl alcohol) (PVOH), 6 grams, was dissolved into 300 mL of deionized water with overhead stirring at 1,000 rpm and 45° C. until completely dissolved. 0.1 g of manganese acetate and 0.2 g of cobalt acetate were dissolved into the PVOH solution, along with 0.2 g of Igepal CO-720. 30 mL of a 70:30 mineral oil/tung oil blend was emulsified into the aqueous solution for 2 minutes at 1,000 rpm overhead stirring, followed by a reduction in stirrer speed to 500 rpm. Oxygen was then bubbled through the system, while stirring, at 45° C. for 20 hrs, resulting in the formation of core-shell microcapsules. Electron micrographs and an optical micrograph of the capsules, <100 μm, are shown in FIGS. 7, 8 and 9 at increasing levels of magnification. Mineral oil was used as the surrogate core material.

Tung Oil Multicore Mineral Oil Capsules

Figure 11:
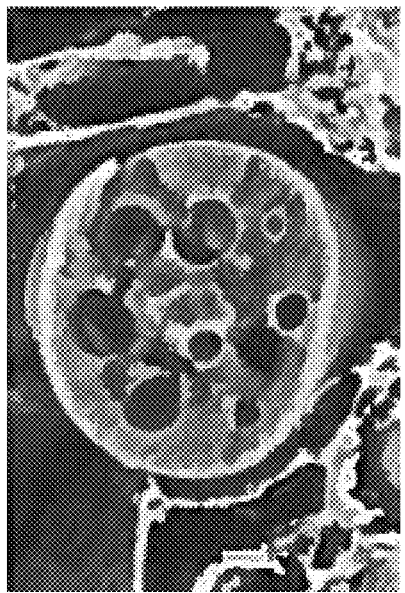
FIGS. 10, 11 and 12 are electron micrographs of microcapsules of a tung oil mineral oil capsule at increasing levels of magnification.
Figure 12:
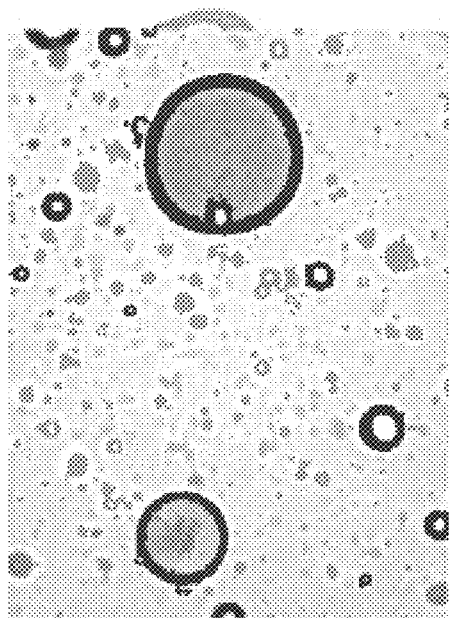
Figure 10:
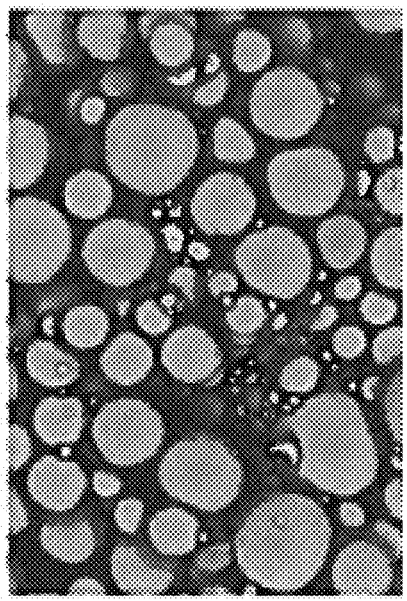

Poly(vinyl alcohol) (PVOH), 6 grams, was dissolved into 300 mL of deionized water with overhead stirring at 1,000 rpm and 45° C. until completely dissolved. 0.1 g of manganese acetate and 0.2 g of cobalt acetate were dissolved into the PVOH solution, along with 0.2 g of Igepal CO-720. 30 mL of a 30:70 mineral oil/tung oil blend was emulsified into the aqueous solution for 2 minutes at 1,000 rpm overhead stirring, followed by a reduction in stirrer speed to 500 rpm. Oxygen was then bubbled through the system, while stirring, at 45° C. for 20 hrs, resulting in the formation of core-shell microcapsules. Electron micrographs and an optical micrograph of the capsules, <100 μm, are shown FIGS. 10, 11 and 12 at increasing magnification. Mineral oil was used as the surrogate core material. FIG. 11 shows a cross section of the capsule and the multicore structure of mineral oil dispersed within the oxidized drying oil matrix.

Tung Oil Core-Shell Canola Oil Microcapsules

Figure 13:
FIGS. 13 and 14 are electron micrographs of a tung oil core-shell canola oil microcapsule at increasing levels of magnification.
Figure 14:
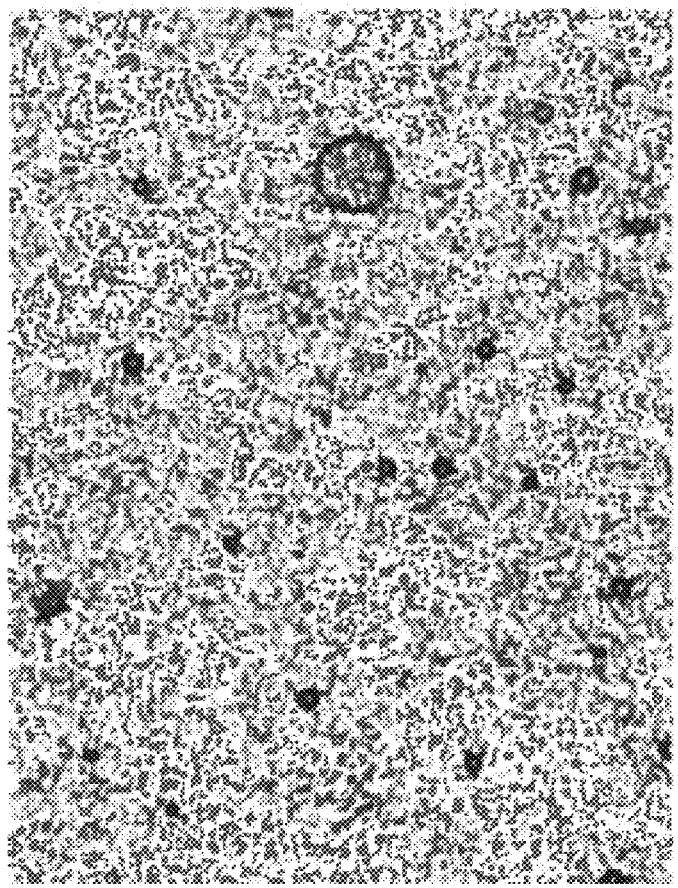

Glyceryl monostearate, 3.0 grams, was dissolved into 300 mL of deionized water with overhead stirring at 1,000 rpm and 45° C. until completely dissolved. 0.1 g of manganese acetate and 0.2 g of cobalt acetate were dissolved into the same aqueous solution, along with 0.3 g of Tween 20. 30 mL of a 70:30 canola oil/Tung oil blend was emulsified into the aqueous solution for 2 minutes at 1,000 rpm overhead stirring, followed by a reduction in stirrer speed to 500 rpm. Oxygen was then bubbled through the system, while stirring, at 80° C. for 4 hrs then 45° C. for 16 hrs, resulting in the formation of core-shell microcapsules. Electron micrographs and an optical micrograph of the capsules, <100 μm, are shown in FIGS. 13 and 14. Canola oil was used as the surrogate core material.

By way of further example, a further protocol was developed using the following general approach: 300 mL of deionized water was used to dissolve 0.2 g of calcium acetate and 0.1 g of manganese acetate (catalysts) with 0.3 g of Tween 20 and 6 g of silica (Aerosil R 812) (surfactants/dispersants). The Tween and silica are nonetheless optional. Separately, 30 mL of an oil phase was prepared with a 30:70 ratio of tung oil (shell material monomer) to active ingredient oil. 0.3 g of cobalt tallate (catalyst) was then dissolved or dispersed into the oil phase. The oil phase was then emulsified (rotor stator homogenizer, 5 k to 18 k rpm) into the aqueous phase followed 300 rpm overhead stirring. The system was heated to 45° C. for 20 hrs, followed by reduction to room temperature for 28 hrs with continued stirring.

Figure 15:
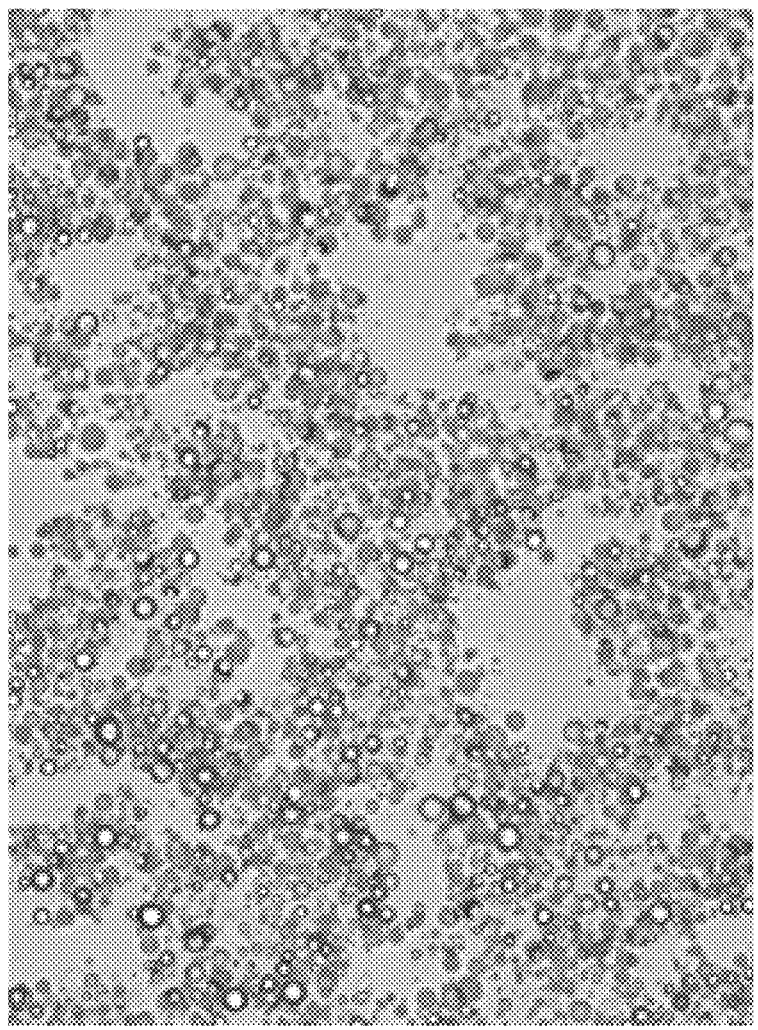
FIG. 15 is an optical micrograph of a lavender oil core in a shell of polymerized tung oil shell.
Figure 16:
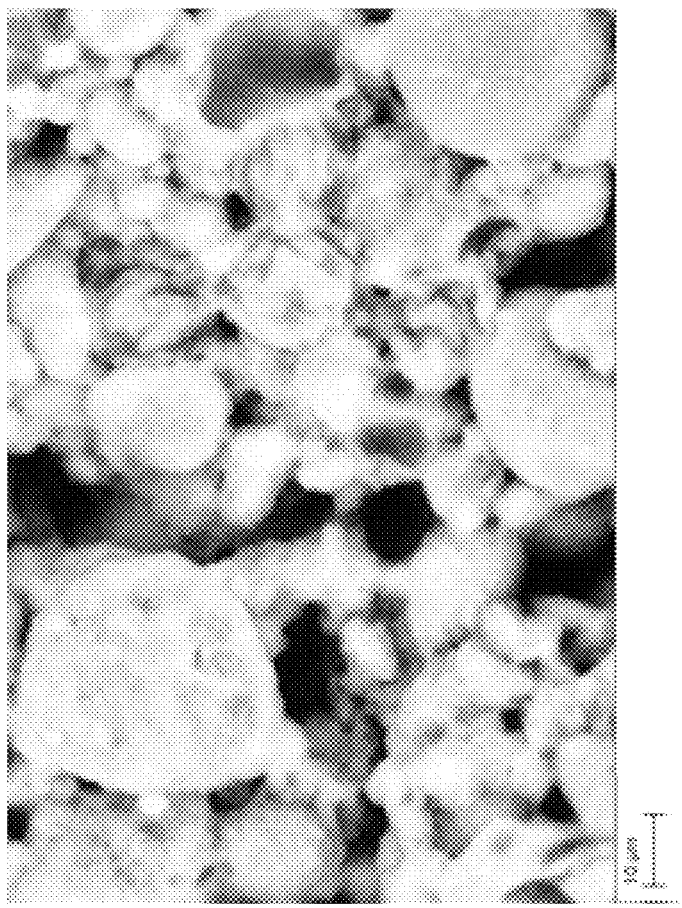
FIG. 16 is an electron micrograph of a lavender core in a shell of polymerized tung oil shell.

Using the formulation and process described above, multiple representative core materials were encapsulated. Lavender oil, a common fragrance essential oil, was first tested. The oil phase was homogenized for 2 minutes at 5000 rpm with a rotor-stator homogenizer prior to curing. The capsules were successfully dried by both lyophilization and filtration. Images of the capsules are shown in FIG. 15 (optical micrograph) and FIG. 16 (electron micrograph).

Figure 17:
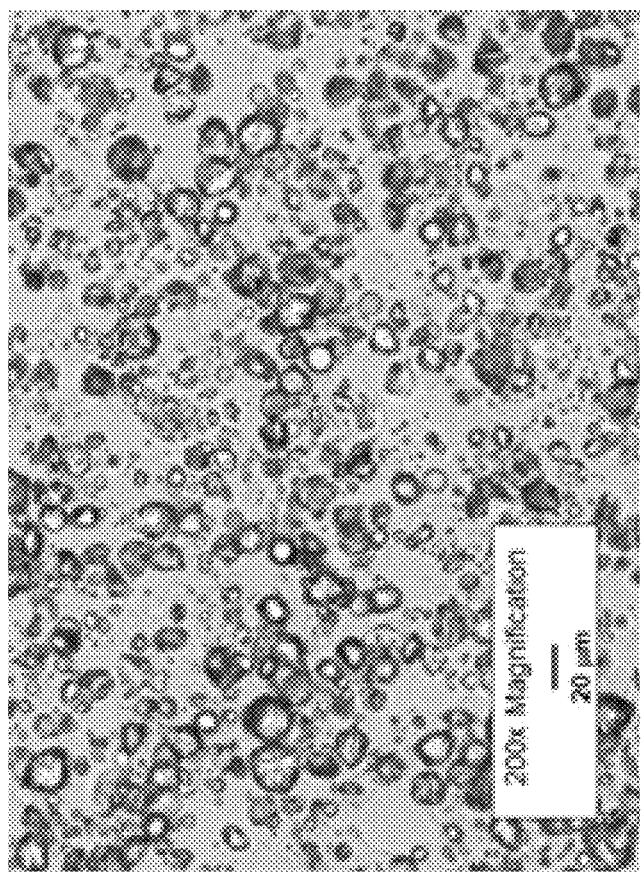
FIG. 17 is an optical micrograph of a microcapsule with an octadecane core with a polymerized tung oil shell.
Figure 18:
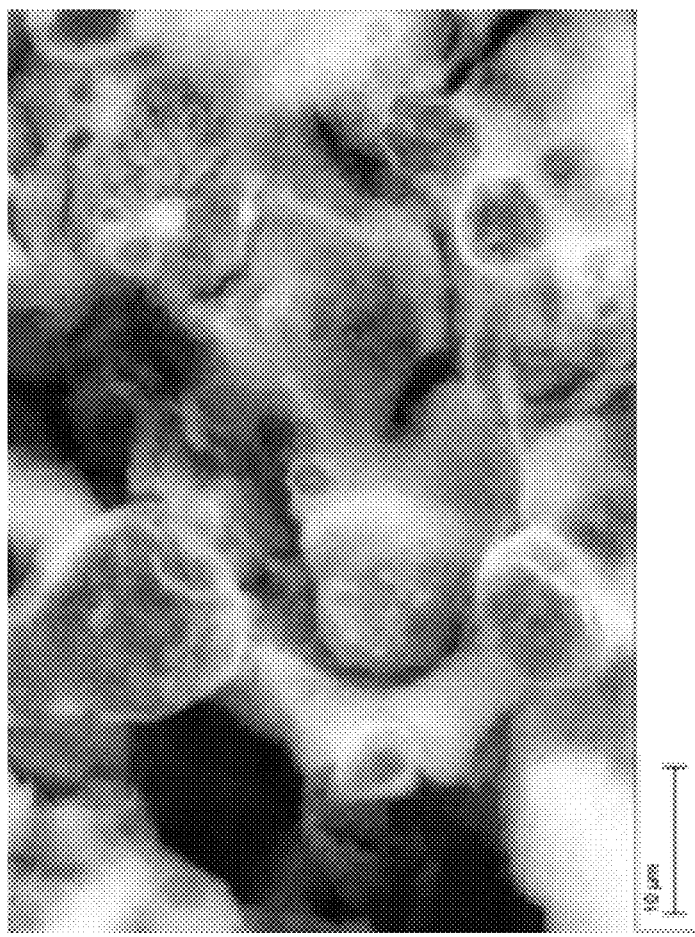
FIG. 18 is an electron micrograph of a microcapsule with an octadecane core with a polymerized tung oil shell.
Figure 19:
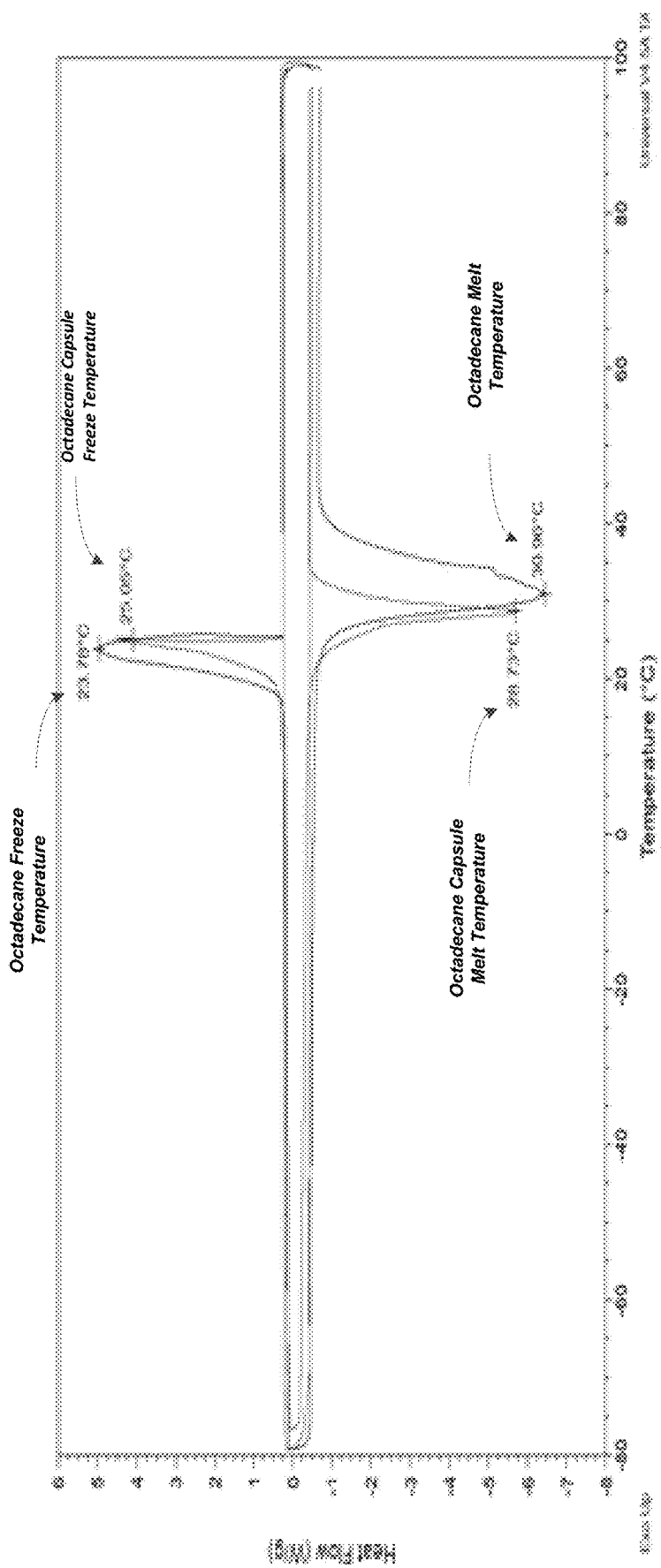
FIG. 19 is a differential scanning calorimetry trace for the octadecane microcapsules compared to tung oil and octadecane.

The formulation and process described herein was also confirmed to be applicable to encapsulate phase change materials (PCMs). Phase change materials are understood herein as materials with a heat of fusion which, upon melting or solidifying at a certain temperature, is capable of storing and releasing energy. Typical PCMs include salt hydrates (e.g. $Na_2SO_4\text{-}10H_2O$), fatty acids and esters and paraffins (acyclic or cyclic saturated hydrocarbons). In the particular process herein one may incorporate the above referenced drying oils into the PCM resulting in formation of the shell. As an example, microcapsules of octadecane were prepared with a drying oil herein (tung oil). The capsules so formed are shown in FIG. 17 (optical micrograph) and FIG. 18 (electron micrograph). The images were taken at room temperature, below the melting point of octadecane, and indicate that the core material was solid after encapsulation with minimal interference from the drying oil. The core is homogeneous as the tung oil is understood to have been consumed in shell production, and the shell is heterogeneous with silica present. Attention is next directed to FIG. 19 which is a differential scanning calorimetry trace for the octadecane capsules compared to tung oil and octadecane. The melt and freeze temperature for octadecane is 30.96° C. and 23.78° C. respectively. The octadecane capsule melt and freeze temperatures were 28.73° C. and 25.05° C. The reported melting point of octadecane is 26-29° C. This data confirms that the encapsulation procedure herein is such that unreacted drying oil (tung oil) has minimal impact on the octadecane thermal properties when encapsulated.

Figure 20:
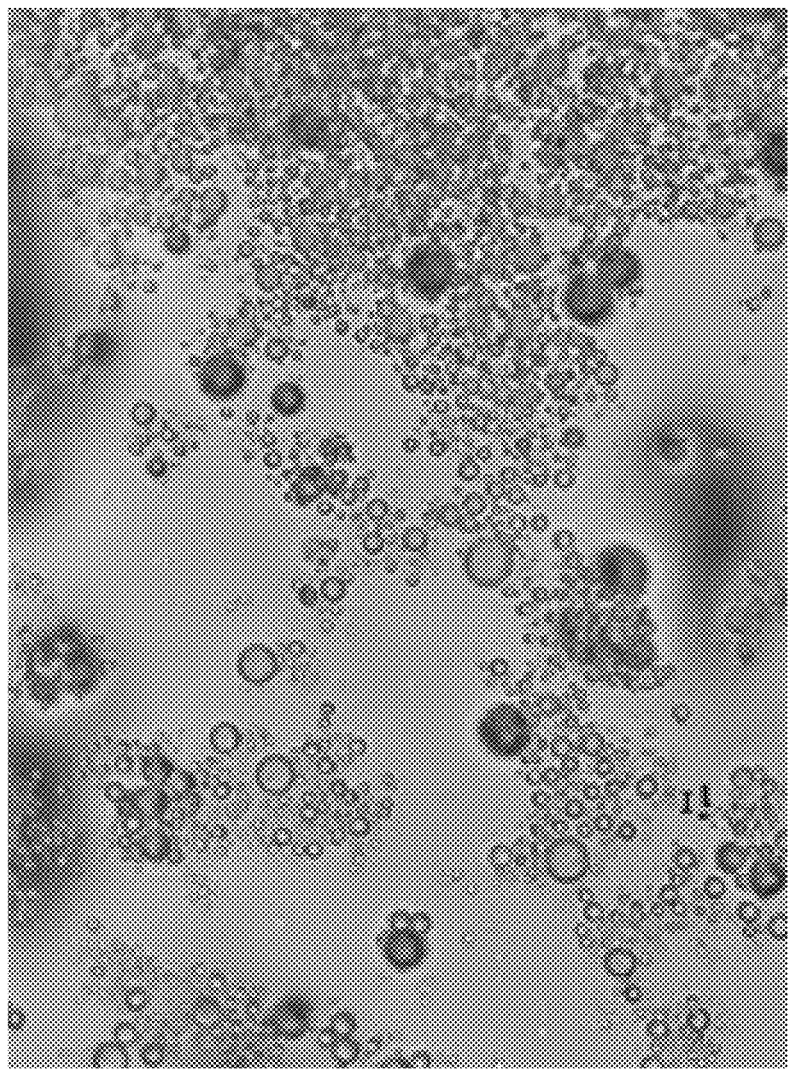
FIG. 20 is an optical micrograph of microcapsules formed using a double emulsion process where Mn/Co acetate catalysts were dissolved in the first aqueous phase and then emulsified into tung oil containing cobalt tallate catalyst followed by curing to crosslink the tung oil and form the microcapsules.
Figure 21:
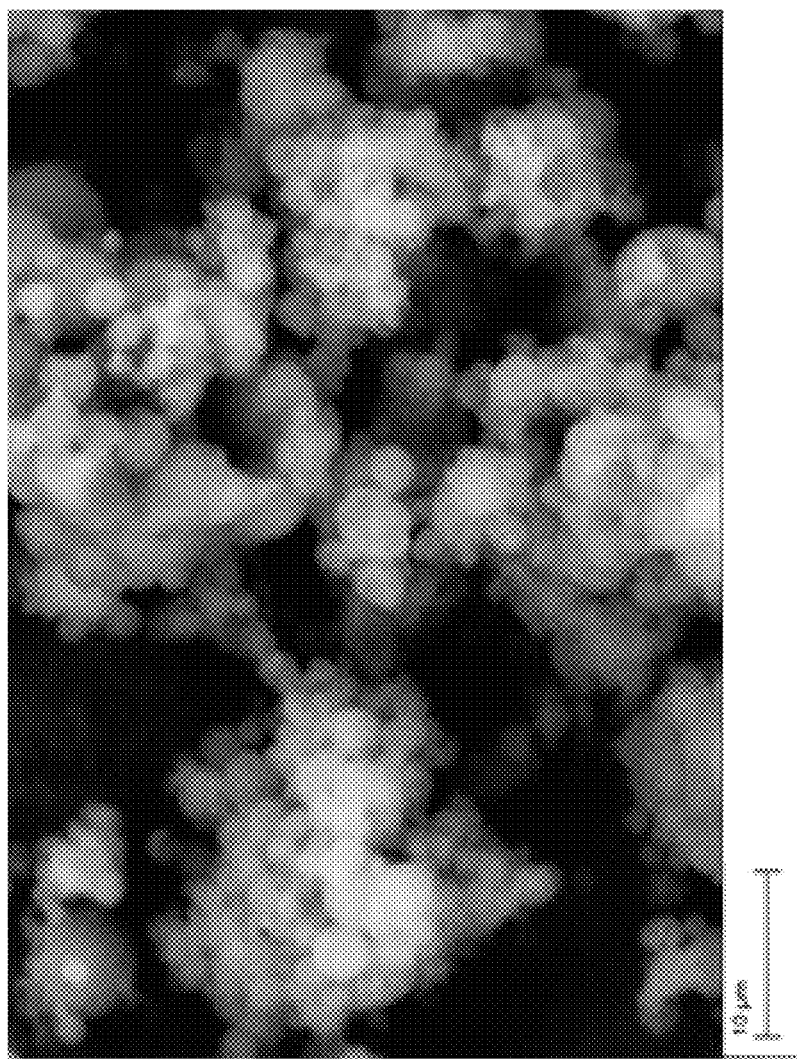
FIG. 21 is an electron micrograph of microcapsules formed using a double emulsion process where Mn/Co acetate catalysts were dissolved in the first aqueous phase and then emulsified into tung oil containing cobalt tallate catalyst followed by curing to crosslink the tung oil and form the microcapsules.

By way of further example, a drying oil formulation system was provided to encapsulate aqueous solutions using a double emulsion approach. For this process, water is emulsified into an oil phase, which is then emulsified into a second aqueous phase. For this formulation, the water soluble Mn/Co acetate catalysts were dissolved into the first aqueous phase, then emulsified into tung oil (containing the previously reported cobalt tallate catalyst). The inclusion of catalyst into the inner aqueous phase helps form a barrier between the water and tung oil, in addition to prohibiting coalescence of the water droplets. The water/tung oil emulsion was then emulsified further into water with additional Mn/Co catalysts for the curing step to crosslink the tung oil. After 48 hours at 45° C., the capsules shown in FIG. 20 (optical micrograph) and FIG. 21 (electron micrograph) were recovered. Using the same procedure as described above, limonene was encapsulated and spray dried as a representative flavor/fragrance.

As can be seen from the above, the present invention relates to a method for producing microcapsules comprising forming a dispersion containing one or more unsaturated alkyl carboxylic acids and/or one or more unsaturated alkyl esters, both at minimum molecular weight of 200, where both are capable of oxidation, and a core material. This is followed by optionally supplying an oxidation catalyst and supplying oxygen to said dispersion and initiating oxidation of said one or more unsaturated alkyl carboxylic acids and/or one or more unsaturated alkyl esters and forming a core-shell microcapsule structure wherein said core-shell structure is formed within a period of ≤96.0 hours. The method is one that can be achieved without the use of harsh/toxic chemicals such as formaldehyde, isocyanates or acyl chlorides. The microcapsules so formed are also gelatin-free and are particularly suitable for food/pharmaceutical applications.

What is claimed is:

1. A method for producing microcapsules comprising:
   forming a dispersion containing one or more unsaturated alkyl carboxylic acids and/or one or more unsaturated alkyl esters, both at a minimum molecular weight of 200 and both capable of oxidation, and a core material;
   optionally supplying an oxidation catalyst in said dispersion;
   supplying oxygen to said dispersion and initiating oxidation of said one or more unsaturated alkyl carboxylic acids and/or one or more unsaturated alkyl esters and forming a core-shell microcapsule structure wherein said core-shell structure is formed within a period of ≤96.0 hours.

2. The method of claim 1 wherein said core material comprises an oil phase and wherein an oxidation catalyst is dissolved or dispersed into said oil phase.

3. The method of claim 1 wherein said dispersion comprises a continuous water phase and said oxidation catalyst is in said water phase.

4. The method of claim 1 wherein said unsaturated alkyl carboxylic acid comprises at least one of linseed oil, tung oil, poppy seed oil, oiticica oil, safflower oil, sunflower oil, soybean oil, cottonseed oil, fish oil, castor oil, *perilla* oil, tall oil and walnut oil or mixtures thereof.

5. The method of claim 1 wherein said unsaturated alkyl carboxylic acid comprises linoleic acid, linolenic acid, palmitic acid, oleic acid, α-eleostearic acid or mixtures thereof.

6. The method of claim 1 wherein said unsaturated alkyl ester comprises a glycerol ester of a fatty acid or mixtures thereof.

7. The method of claim 2 wherein said oxidation catalyst comprises at least one of cobalt acetate, cobalt tallate, cobalt chloride, cobalt sulfate, iron sulfate, manganese acetate, manganese chloride or manganese sulfate.

8. The method of claim 1 wherein said core-shell structure is formed within a period of ≤72 hours.

9. The method of claim 1 wherein said core-shell structure is formed within a period of ≤48 hours.

10. The method of claim 1 wherein said core-shell structure is formed within a period of 24 to 48 hours.

11. The method of claim 1 wherein said core-shell structure is formed within a period of 12 to 24 hours.

12. The method of claim 1 wherein said core-shell structure is formed within a period of 6 to 12 hours.

13. The method of claim 1 wherein said dispersion is at a temperature of 1° C. to 100° C.

14. The method of claim 1 wherein said core-shell microcapsule has a size of ≥0.1 μm to 1,000 μm.

15. The method of claim 1 wherein said core-shell microcapsule structure comprises a heterogeneous shell morphology.

16. The method of claim 1 wherein said core-shell microcapsule structure comprises a heterogeneous core morphology.

17. The method of claim 1 wherein said core-shell microcapsule structure comprises a heterogeneous shell morphology and a heterogeneous core morphology.

18. The method of claim 1 wherein said core comprises a phase change material.

19. The method of claim 1 wherein said core comprises a fragrance.

20. A method for producing microcapsules comprising:
forming a dispersion containing one or more unsaturated alkyl carboxylic acids and/or one or more unsaturated alkyl esters, both at a minimum molecular weight of 200 and both capable of oxidation, and a core material, said core material providing an oil-phase;
supplying an oxidation catalyst wherein said oxidation catalyst is dissolved or dispersed in said oil-phase;
supplying oxygen to said dispersion and initiating oxidation of said one or more unsaturated alkyl carboxylic acid and/or one or more unsaturated alkyl esters and maintaining the temperature of said dispersion at 1° C. to 100° C. and forming a core-shell microcapsule structure at a size of ≥0.1 μm to 1,000 μm wherein said core-shell structure is formed within a period of ≤96.0 hours.

21. The method of claim 20 wherein said oxidation catalyst comprises at least one of cobalt acetate, cobalt tallate, cobalt chloride, cobalt sulfate, iron sulfate, manganese acetate, manganese chloride or manganese sulfate.

22. A method for producing microcapsules comprising:
forming a dispersion containing one or more unsaturated alkyl carboxylic acids and/or one or more unsaturated alkyl esters, both at a minimum molecular weight of 200 and both capable of oxidation, and a core material;
optionally supplying an oxidation catalyst in said dispersion;
supplying oxygen to said dispersion and initiating oxidation of said one or more unsaturated alkyl carboxylic acids and/or one or more unsaturated alkyl esters and forming a microcapsule structure wherein said microcapsule is formed within a period of ≤96.0 hours.

23. The method of claim 22 wherein said core material is soluble in said one or more unsaturated alkyl carboxylic acids and/or one or more unsaturated alkyl esters.

24. The method of claim 22 wherein said core material comprises liquid droplets or solid particles or gas bubbles dispersed in a continuous phase of said oxidized one or more unsaturated alkyl carboxylic acids and/or one or more unsaturated alkyl esters.

* * * * *